United States Patent
Jorgensen et al.

(10) Patent No.: US 7,160,641 B2
(45) Date of Patent: Jan. 9, 2007

(54) METHODS TO COOL A FUEL CELL AND IF DESIRED HEAT A HYBRID BED SIMULTANEOUSLY

(75) Inventors: Scott Willis Jorgensen, Bloomfield Township, Oakland County, MI (US); Brian Garfield Wicke, Bloomfield Hill, MI (US)

(73) Assignee: General Motors Corporation, Detroit, MI (US)

( * ) Notice: Subject to any disclaimer, the term of this patent is extended or adjusted under 35 U.S.C. 154(b) by 232 days.

(21) Appl. No.: 10/693,009

(22) Filed: Oct. 24, 2003

(65) Prior Publication Data

US 2005/0089735 A1    Apr. 28, 2005

(51) Int. Cl.
H01M 8/04    (2006.01)
F25J 5/00    (2006.01)
F25B 13/00   (2006.01)

(52) U.S. Cl. .................. 429/26; 429/24; 429/20; 62/649; 62/324.6; 62/238.7; 62/239; 62/324.1

(58) Field of Classification Search ............ 429/26, 429/24, 20; 62/649, 324.6, 238.7, 239, 324.1
See application file for complete search history.

(56) References Cited

U.S. PATENT DOCUMENTS

| | | | |
|---|---|---|---|
| 5,678,410 A * | 10/1997 | Fujita et al. ............ 62/7 |
| 6,195,999 B1 * | 3/2001 | Arnold et al. ............ 60/649 |
| 6,370,903 B1 * | 4/2002 | Wlech .................... 62/324.6 |
| 6,584,796 B1 * | 7/2003 | Itoh et al. ............... 62/324.1 |
| 6,605,377 B1 * | 8/2003 | Kimbara et al. ........... 429/26 |
| 6,802,875 B1 * | 10/2004 | Kimbara et al. ........... 48/61 |
| 2003/0157386 A1 * | 8/2003 | Gottmann et al. ......... 429/26 |
| 2004/0219408 A1 * | 11/2004 | Hesse .................... 429/26 |
| 2004/0221607 A1 * | 11/2004 | Heyl ..................... 62/324.1 |
| 2005/0074650 A1 * | 4/2005 | Sridhar et al. ............ 429/30 |
| 2005/0103487 A1 * | 5/2005 | Aflekt et al. ............. 165/202 |

\* cited by examiner

*Primary Examiner*—Patrick Joseph Ryan
*Assistant Examiner*—Angela J. Martin
(74) *Attorney, Agent, or Firm*—Cary W. Brooks

(57) ABSTRACT

A technique for rejecting heat from a fuel cell stack. Heated stack coolant from the fuel cell stack is directed to a heat pump module where it is compressed to raise its temperature. The heated and compressed coolant is then directed through a radiator that cools the coolant through interaction with ambient air. The coolant is then sent through an expansion aperture to reduce its pressure, and thus, further reduce its temperature before it is sent back to the fuel cell stack to collect waste heat therefrom. The heated and compressed coolant can be sent to hydride bed to release hydrogen therefrom before it is sent to the radiator. In one embodiment, the coolant is hydrogen.

16 Claims, 3 Drawing Sheets

METHODS TO COOL A FUEL CELL AND IF DESIRED HEAT A HYBRID BED SIMULTANEOUSLY

BACKGROUND OF THE INVENTION

1. Field of the Invention

This invention relates generally to a technique for removing heat from a fuel cell stack and, more particularly, to a technique for removing heat from a fuel cell stack that includes employing a heat pump to increase the temperature of heated coolant from the fuel cell stack to provide a greater temperature difference between the heated coolant and the ambient air to more effectively reject the heat.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode charge gas that includes oxygen, and is typically a flow of forced air from a compressor. Not all of the oxygen in the air is consumed by the stack and some of the air is output as a cathode exhaust gas that may include water as a stack by-product.

The humidity or wetness of the membranes in a fuel cell stack is an important design criteria for effective stack operation. Too much water within the stack acts to prevent the oxygen in the cathode input gas from reaching the catalyst on the cathodes. Too little water within the stack causes the stack membranes to dry out and become more susceptible to cracking and other damage. The more current that the stack generates, the more water is generated as a by-product of the electrochemical process. However, the more air that is forced through the stack by the compressor to provide more current, the more the stack membranes dry out. Typically, the stack has a 110% relative humidity during its most efficient operation. For 110% relative humidity, the exhaust gas is saturated 100%, and also includes a little bit of excess water.

One factor that affects the stack relative humidity is stack temperature. As the stack temperature increases, the stack's ability to hold water in the vapor state also increases making it more difficult to maintain a desired stack relative humidity because more water is required to do so. Another factor that affects stack relative humidity is the stack pressure. As the pressure in the stack increases, the ability of the stack to hold water in the vapor state decreases. Thus, one of the most commonly used techniques to control cathode relative humidity is to control the fuel cell system pressure and temperature.

Fuel cell systems must reject waste heat generated by the fuel cell operation to prevent the stack membranes from drying out and being damaged. Typically, the fuel cell must operate at temperatures near 80° C. to provide the desired performance. A fuel cell system will include a thermal coolant sub-system that removes heat from the stack so that it operates at its desired operating temperature for proper membrane humidity. Heated coolant from the stack is directed to a radiator that reduces the temperature of the coolant so that it can be returned to the stack to remove the stack waste heat. The radiator uses ambient air to reduce the temperature of the coolant, and it is the difference between the temperature of the heated coolant and the ambient temperature that determines how effective the radiator will be at removing heat from the coolant for a particular radiator size.

It is desirable to reduce the size of the radiator as much as possible to conserve space and vehicle weight. However, the smaller the radiator, the less heat the radiator can reject. As discussed above, if the temperature of the fuel cell stack is too high, the membranes within the stack can be damaged. Therefore, there is a limit as to how small the radiator can be reduced relative to the stack requirements so that the proper amount of heat is removed.

SUMMARY OF THE INVENTION

In accordance with the teachings of the present invention, a technique is disclosed for rejecting heat from a fuel cell stack. In one embodiment, the heated stack coolant is directed from the fuel cell stack to a heat pump module where it is compressed to raise its temperature. The heated and compressed coolant is then directed through a cooling device that cools the coolant through interaction with ambient air. The coolant is then sent through an expansion aperture to reduce its pressure, and thus, further reduce its temperature before it is sent back to the fuel cell stack to collect waste heat therefrom.

According to another embodiment, the coolant from the fuel cell stack is directed to a heat exchanger within the heat pump module. A second coolant flows through the heat exchanger and collects heat from the stack coolant to cool the stack coolant. The second coolant from the heat exchanger is compressed to further increase its temperature. The compressed and heated coolant from the heat exchanger is directed to a hydride tank holding hydrogen fuel. The heated coolant releases the hydrogen in the hydride tank that is directed to the anode input of the fuel cell stack. The hydrogen liberation process cools the second coolant. The cooled coolant from the hydride tank is sent through a cooling device to be cooled by the ambient air, and then is expanded by an expansion aperture to be further cooled before it is sent back to the heat exchanger. In an alternate to this embodiment, the heat exchanger is eliminated, and the coolant from the fuel cell stack is directed to the hydride tank after it is compressed in the heat pump module. In an alternate embodiment, the coolant is hydrogen so that the compressed hydrogen coolant is mixed with the hydrogen in the hydride tank, and can be used for the stack input or as the coolant at the output of the hydride tank.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a technique for rejecting waste heat from a fuel cell stack is merely exemplary in nature, and is in no way intended to limit the invention or its applications or uses.

Figure 1:
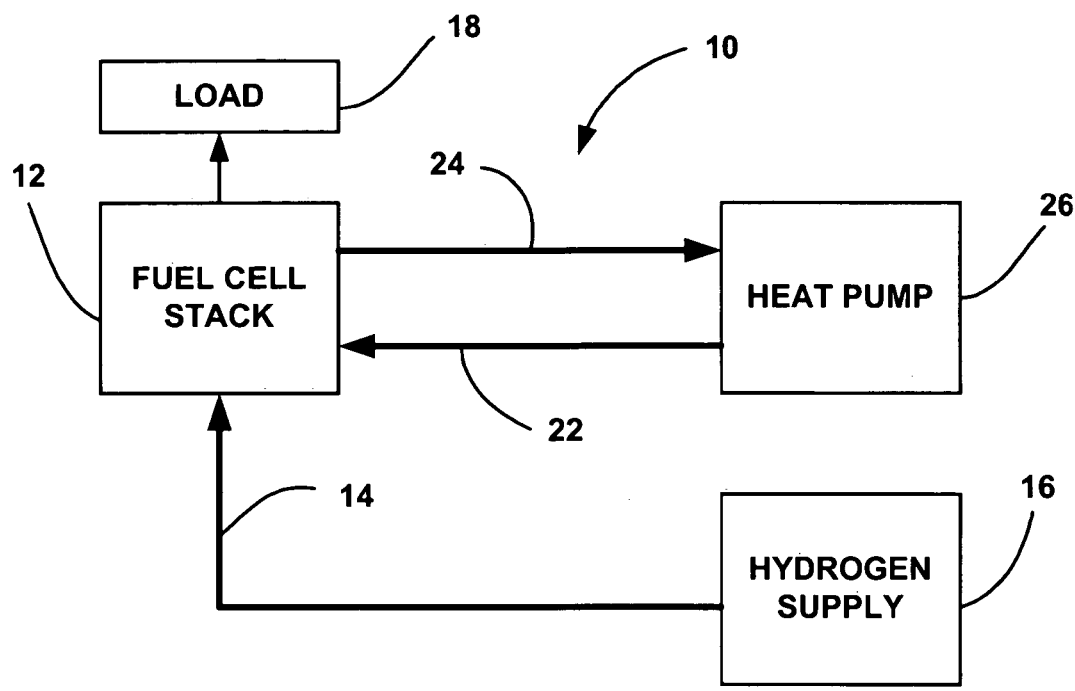
FIG. 1 is a block plan view of a fuel cell system employing a technique for rejecting heat from a fuel cell stack in the system, according to an embodiment of the present invention.

FIG. 1 is a block plan view of a fuel cell system 10 employing a fuel cell stack 12 of the type discussed above, according to an embodiment of the present invention. The fuel cell stack 12 receives hydrogen at an anode input on an anode input line 14 from a hydrogen supply 16. The fuel cell stack 12 generates output power that is used to drive a load 18, such as a vehicle and vehicle accessories.

As discussed above, it is necessary to reject waste heat from the fuel cell stack 12 during its operation to control the temperature of the stack 12 so that the membranes therein do not dry out and are damaged. According to the invention, a coolant is provided to the fuel cell stack 12 on a coolant input line 22 that is heated by the fuel cell stack 12 to remove heat from the stack 12, and is output therefrom as heated coolant on a coolant output line 24. The coolant can be any coolant suitable for the purposes discussed herein, such as 134A. The heated coolant on the line 24 is applied to a heat pump module 26 that reduces the temperature of the coolant to be returned on the coolant input line 22.

Figure 2:
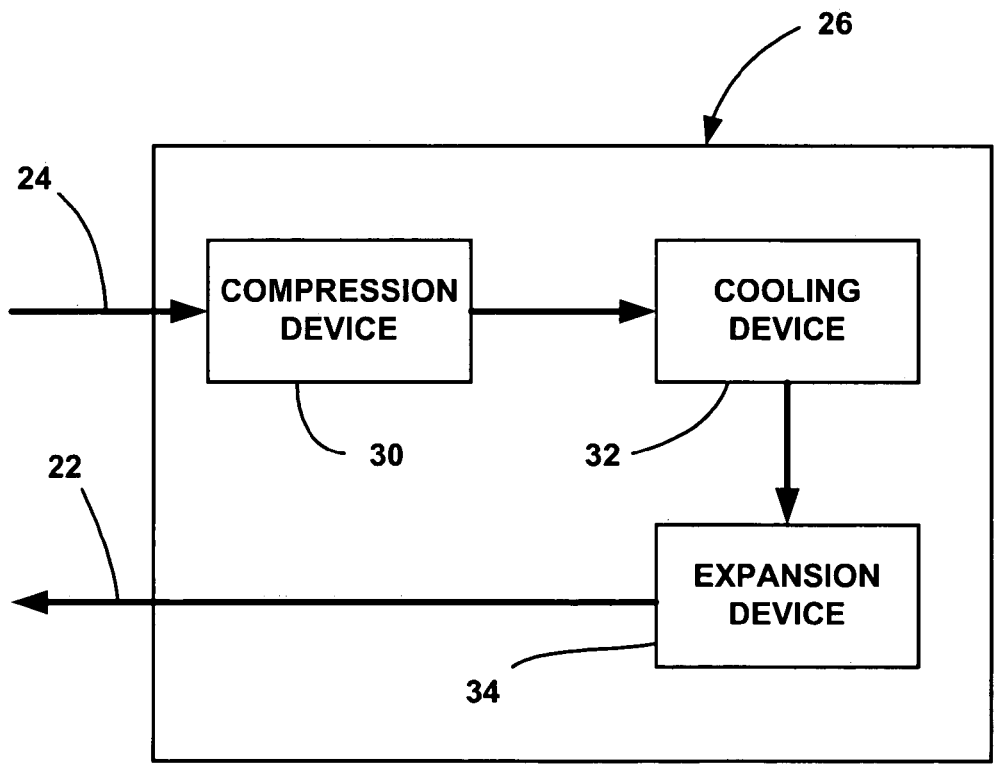
FIG. 2 is a plan view of a heat pump module in the fuel cell system shown in FIG. 1.

FIG. 2 is a block diagram of the heat pump module 26. The heated coolant on the line 24 is applied to a compression device 30 within the heat pump module 26 that compresses the coolant, and thus raises its temperature. Therefore, instead of the temperature of the heated coolant on the line 24 being relatively close to the temperature of the ambient air, the temperature of the coolant after it is compressed by the compression device 30 is significantly greater than the ambient air temperature. The compression device 30 can be any compression device suitable for the purposes discussed herein. The compression device 30 is operated by electrical energy from a suitable source, such as a battery or the fuel cell stack 12.

The compressed and heated coolant is then sent to a cooling device 32, such as a radiator or cooling fins, that cools the coolant through interaction with the ambient air in a manner that is well known in the art. Because there is a significant temperature difference between the compressed coolant and the ambient air, the cooling device 32 is able to remove a significant amount of heat from the compressed coolant, and thus the size of the cooling device 32 can be reduced from those currently used in the art.

The cooled and compressed coolant from the cooling device 32 is then applied to an expansion device 34 where the pressure of the coolant is reduced, and thus its temperature is significantly decreased. The expansion device 34 can be any expansion device suitable for the purposes. In one embodiment, the expansion device 34 is an orifice that separates a high pressure chamber from a low pressure chamber. The heat pump module 26 is shown herein as including all of the compression device 30, the cooling device 32 and the expansion device 34. However, the compression device 30, the cooling device 32 and the expansion device 34 do not necessarily need to be part of the same unit, and probably will be at separate locations in the vehicle for the desired performance. The reduced pressure coolant is then sent to the input line 22 to be returned to the fuel cell stack 12 to remove waste heat therefrom.

Figure 3:
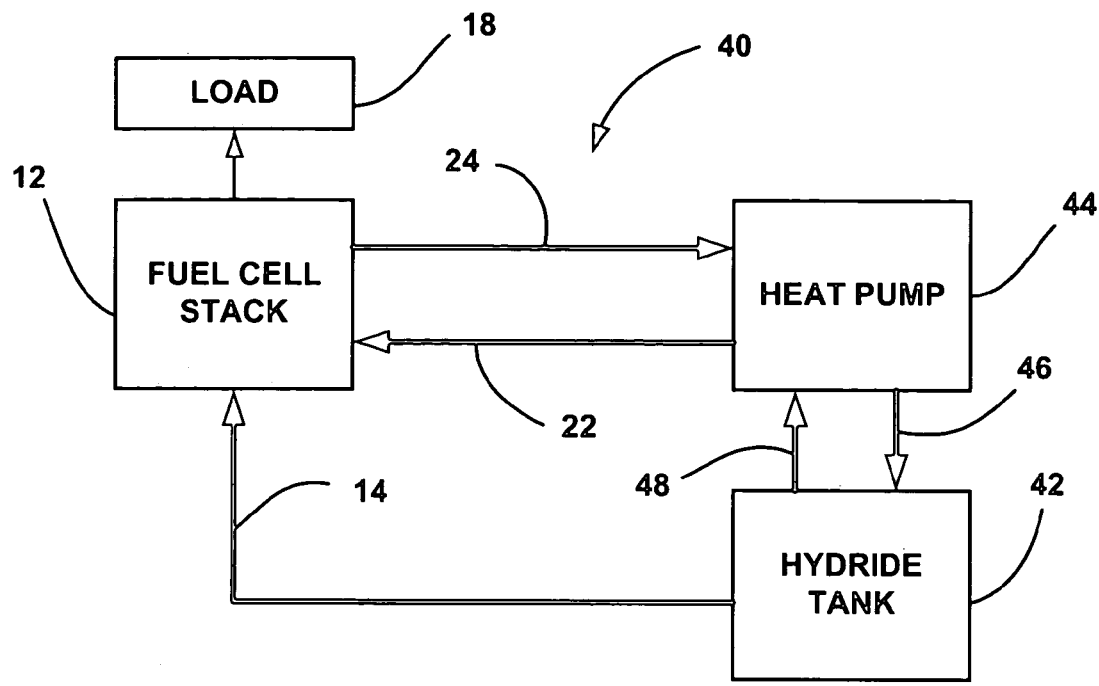
FIG. 3 is a block plan view of a fuel cell system employing a technique for rejecting heat from a fuel cell stack in the system, according to another embodiment of the present invention.

FIG. 3 is a block plan view of a fuel cell system 40, according to another embodiment of the present invention, where like elements to the system 10 are identified by the same reference numeral. In this embodiment, the hydrogen supply 16 is a hydride tank 42 that includes a hydride monolith or powder that releases hydrogen when it is heated, as is well known in the art. The system 40 also includes a heat pump module 44 that provides a heated coolant on line 46 to the hydride tank 42 to release the hydrogen therein to be provided on the line 14. The operation of heating the hydride within the tank 42 reduces the temperature of the coolant, which is output therefrom on line 48. The hydride within the hydride tank 42 can be any suitable hydride for the purposes discussed herein. In certain designs, the hydride used releases hydrogen at a high temperature relative to the fuel cell operating temperature, such as 150° C.

Figure 4:
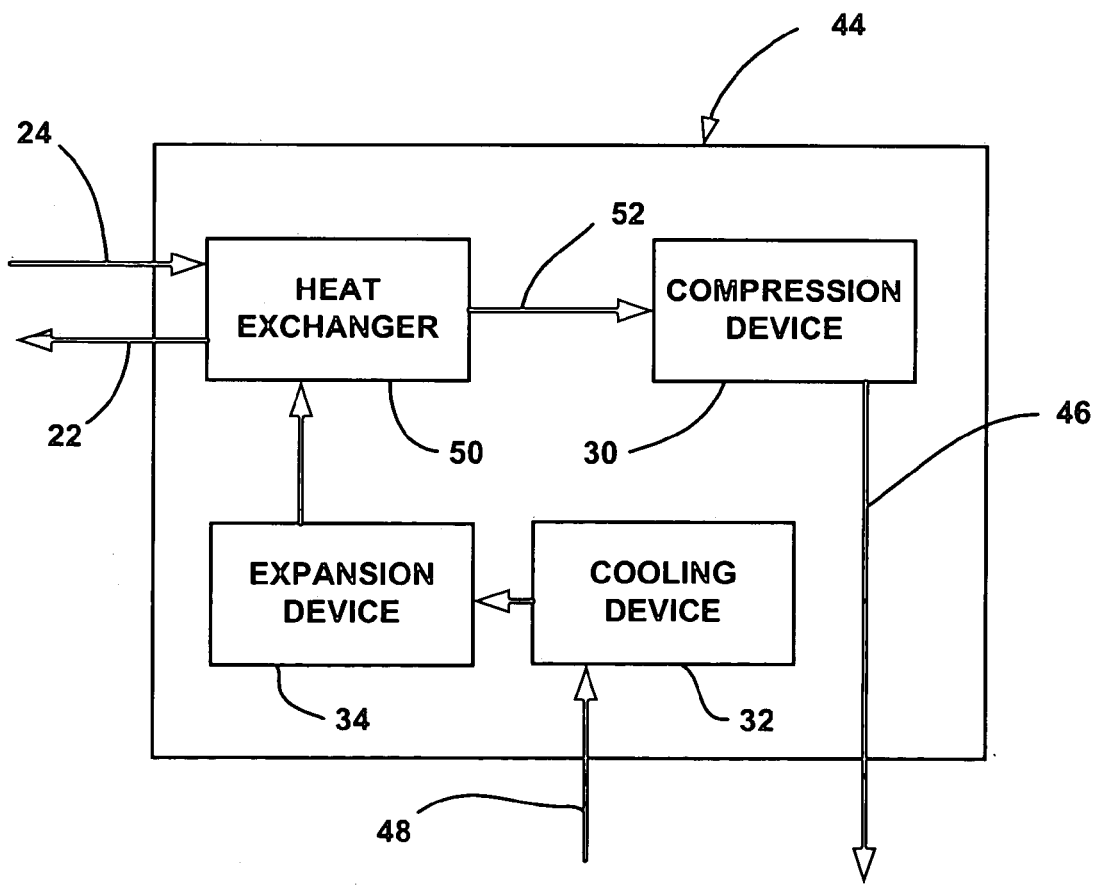
FIG. 4 is a block diagram of a heat pump module used in the fuel cell system shown in FIG. 3.

FIG. 4 is a block plan view of the heat pump module 44 in the system 40. In this embodiment, the heated coolant on the line 24 is applied to a heat exchanger 50 where its temperature is reduced to be output therefrom as the cooled coolant on the line 22. A coolant loop 52 within the heat pump module 44 also directs a coolant through the heat exchanger 50 to remove the heat from the coolant on the line 24. In this embodiment, the coolant from the heat exchanger 50 in the coolant loop 52 is applied to the compression device 30 that raises its pressure and temperature relative to the ambient air. The heated and compressed coolant is then sent to the hydride tank 42 to release the hydrogen therein. The cooled, but warm, coolant in the loop 52 from the hydride tank 42 is then sent to the cooling device 32 in the heat pump module 44 to further reduce the temperature of the coolant. The compressed and cooled coolant is then sent to the expansion device 34 that reduces the pressure of the coolant to further reduce its temperature. The now cooled coolant in the coolant loop 52 is sent to the heat exchanger 50 to remove heat from the heated coolant on the line 24, as discussed above.

A controller (not shown) would control the amount of the coolant on the line 46 that is applied to the hydride in the hydride tank 42 so that the proper amount of hydrogen is provided on the line 14 so that the power delivered by the fuel cell stack 12 drives the vehicle at the speed selected by the operator. For example, a suitable valve (not shown) could be provided in the line 46 that is controlled by the controller to cause a select amount of the coolant to by-pass the tank 42 and be applied directly to the line 48 on a separate line (not shown). Such a control system is already provided in a vehicle, and one of ordinary skill in the art would recognize how to incorporate that controller in the fuel cell system discussed herein. Further, because the coolant is cooled by releasing the hydrogen in the hydride tank 42, in certain modes of operation the temperature of the coolant may be lowered enough where the cooling device 32 does not need to be used.

Figure 5:
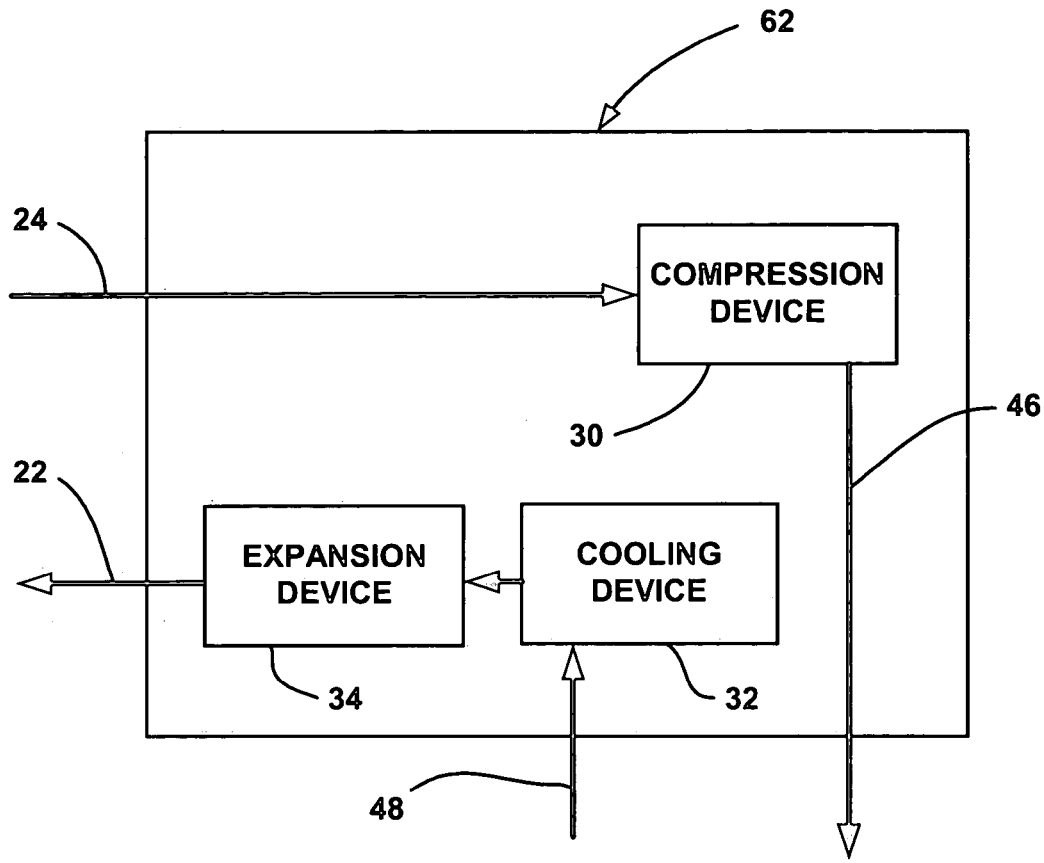
FIG. 5 is a block diagram of a heat pump module capable of being used in the fuel cell system shown in FIG. 3, according to another embodiment of the present invention.

FIG. 5 is a block plan view of a heat pump module 62 that can replace the heat pump module 44 in the system 40, according to another embodiment of the present invention. In this design, the heat exchanger 50 has been eliminated and the coolant applied to the fuel cell stack 12 is also applied to the hydride tank 42. The operation of the compression device 30, the cooling device 32 and the expansion device 34 is the same as discussed above.

Figure 6:
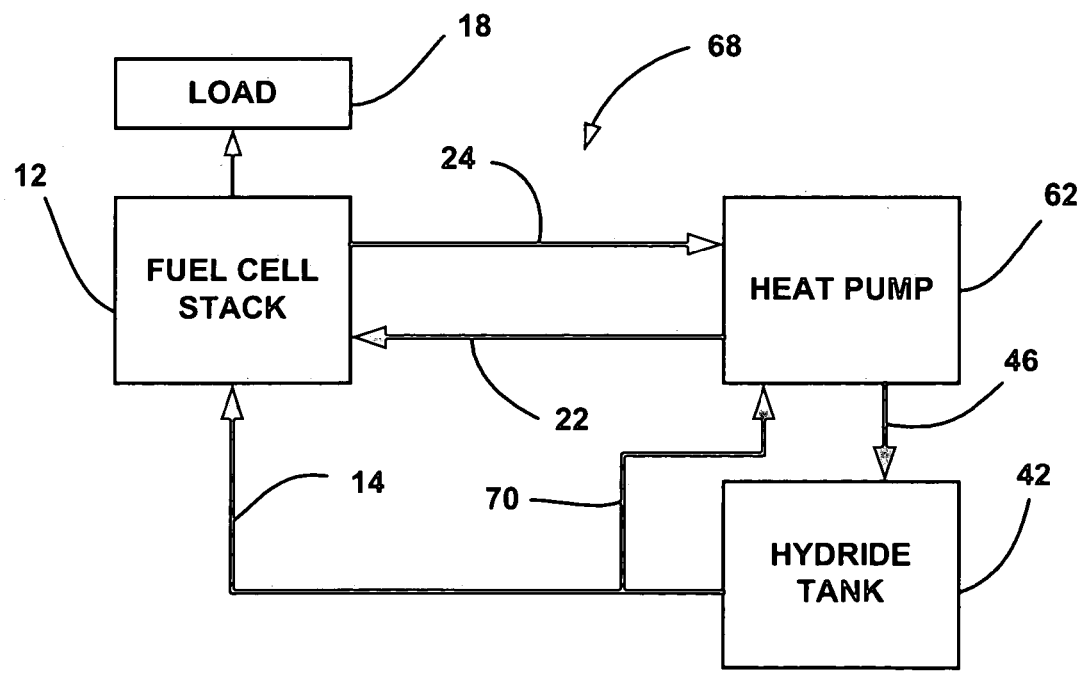
FIG. 6 is a block diagram of a fuel cell system employing hydrogen as a coolant, according to another embodiment of the present invention.

FIG. 6 is a block plan view of a fuel cell system 68, according to another embodiment of the present invention, where like elements to the systems 10 and 40 discussed above are identified by the same reference number. In this embodiment, the coolant that flows through the fuel cell stack 12 to cool it is hydrogen. The hydrogen on the line 24 from the fuel cell stack 12 is applied to the heat pump module 62 shown in FIG. 5 where it is compressed before being sent to the hydride tank 42. Because it is hydrogen that is the coolant applied to the hydride tank 42, the hydrogen coolant does not need to be separated from the released hydrogen from the hydride bed. Therefore, the various channels, fins, separating structures, etc. that normally would be necessary to separate the coolant from the hydrogen in the tank 42 are not necessary, reducing the weight of the system. The hydrogen output from the hydride tank 42 on the line 14 is applied to the fuel cell stack 12, as above, but some of the hydrogen on a line 70 is applied to the heat pump mode 62 as the return coolant applied to the cooling device 32.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack generating output power and heat, said fuel cell stack being responsive to a coolant on a coolant input line and outputting heated coolant on a coolant output line; and
   a heat pump module responsive to the heated coolant on the coolant output line, said heat pump module including a compression device that compresses the heated coolant to raise its temperature and pressure, said heat pump module further including a cooling device that is responsive to the heated and compressed coolant from the compression device, said cooling device reducing the temperature of the compressed coolant, said heat pump module further including an expansion device responsive to the cooled and compressed coolant from the cooling device, said expansion device decreasing the pressure and temperature of the coolant to further cool the coolant, where the cooled coolant is applied to the fuel cell stack on the coolant input line.

2. The system according to claim 1 further comprising a hydride bed, said compressed coolant from the compression device being applied to the hydride bed to heat a hydride therein and release hydrogen, said coolant from the hydride bed being applied to the radiator.

3. The system according to claim 2 wherein the coolant is hydrogen.

4. The system according to claim 1 wherein the cooling device is selected from the group consisting of radiators and cooling fins.

5. The system according to claim 1 wherein the expansion device is an orifice separating a high pressure chamber and a low pressure chamber.

6. The system according to claim 1 wherein the fuel cell system provides power to a vehicle.

7. A fuel cell system comprising:
   a fuel cell stack generating output power and heat, said fuel cell stack being responsive to a stack coolant on a coolant input line and outputting heated stack coolant on a coolant output line; and
   a heat pump module, said heat pump module including a heat exchanger responsive to the heated stack coolant on the coolant output line, said heat exchanger also being responsive to a heat pump coolant, said heat pump coolant cooling the stack coolant before it is applied to the coolant input line, said heat pump module including a compression device that compresses the heat pump coolant from the heat exchanger to raise its temperature and pressure, said heat pump module further including a cooling device that is responsive to the heated and compressed coolant from the compression device, said cooling device reducing the temperature of the compressed coolant, said heat pump module further including an expansion device responsive to the cooled and compressed coolant from the cooling device, said expansion device decreasing the pressure and temperature of the coolant to further cool the coolant, wherein the cooled heat pump coolant is applied to the heat exchanger.

8. The system according to claim 7 further comprising a hydride bed, said compressed coolant from the compression device being applied to the hydride bed to heat a hydride therein and release hydrogen, said coolant from the hydride bed being applied to the radiator.

9. The system according to claim 8 wherein the coolant is hydrogen.

10. The system according to claim 7 wherein the cooling device is selected from the group consisting of radiators and cooling fins.

11. The system according to claim 7 wherein the expansion device is an orifice separating a high pressure chamber and a low pressure chamber.

12. The system according to claim 7 wherein the fuel cell system provides power to a vehicle.

13. A fuel cell system comprising:
   a fuel cell stack generating output power and heat, said fuel cell stack being responsive to a coolant on a coolant input line and outputting heated coolant on a coolant output line;

a heat pump responsive to the heated coolant on the coolant output line, said heat pump including a compression device for compressing the heated coolant and an expansion device for expanding the compressed coolant; and a hydride bed having sufficient heat consumption to accept all the heat produced by the fuel cell, said compressed coolant from the compression device being applied to the hydride bed to heat a hydride therein and release hydrogen, said coolant from the hydride bed being applied to the expansion device.

14. The system according to claim 13 wherein the coolant is hydrogen.

15. The system according to claim 13 wherein the expansion device is an orifice separating a high pressure chamber and a low pressure chamber.

16. The system according to claim 13 wherein the fuel cell system provides power to a vehicle.

* * * * *